(12) United States Patent
Raney et al.

(10) Patent No.: US 11,190,417 B2
(45) Date of Patent: Nov. 30, 2021

(54) METHODS, SYSTEMS, AND COMPUTER READABLE MEDIA FOR PROCESSING NETWORK FLOW METADATA AT A NETWORK PACKET BROKER

(71) Applicant: Keysight Technologies, Inc., Santa Rosa, CA (US)

(72) Inventors: Kristopher Len Raney, Oak Park, CA (US); Jonathan Glenn Stroud, Austin, TX (US); Matthew R. Bergeron, Sunol, CA (US); Peter J. Marsico, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/781,542

(22) Filed: Feb. 4, 2020

(65) Prior Publication Data

US 2021/0243091 A1 Aug. 5, 2021

(51) Int. Cl.
*H04L 12/26* (2006.01)
*H04L 12/851* (2013.01)
*H04L 9/08* (2006.01)

(52) U.S. Cl.
CPC .......... *H04L 43/026* (2013.01); *H04L 9/0819* (2013.01); *H04L 43/04* (2013.01); *H04L 43/0811* (2013.01); *H04L 43/0888* (2013.01); *H04L 47/2483* (2013.01)

(58) Field of Classification Search
CPC ..... H04L 43/026; H04L 47/10; H04L 45/745; H04L 43/00; H04L 47/00; H04L 67/2804; H04L 29/08711; G06F 15/16

USPC ........................................................ 709/224
See application file for complete search history.

(56) References Cited

U.S. PATENT DOCUMENTS

| | | | |
|---|---|---|---|
| 6,240,416 B1 * | 5/2001 | Immon | .................. G06F 16/27 |
| 6,480,488 B1 | 11/2002 | Huang | |
| 7,340,744 B2 | 3/2008 | Chandwadkar et al. | |
| 7,363,353 B2 | 4/2008 | Ganesan et al. | |

(Continued)

FOREIGN PATENT DOCUMENTS

| | | | | |
|---|---|---|---|---|
| EP | 2777226 B1 * | 8/2019 | ............. | H04L 63/20 |
| EP | 3528430 A1 * | 8/2019 | ............. | H04L 45/64 |
| WO | WO-2016176070 A1 * | 11/2016 | ......... | H04L 41/0853 |

OTHER PUBLICATIONS

Elsen et al., "goProbe: A Scalable Distributed Network Monitoring Solution", 2015 (Year: 2015).*

(Continued)

*Primary Examiner* — Ondrej C Vostal

(57) ABSTRACT

A method for network flow metadata processing at a network packet broker includes, receiving, as input at the network packet broker, network flow metadata, the network flow metadata including a network flow statistic generated by a network device regarding packets in the network flow. The method further includes accessing, by the network packet broker, a network flow metadata processing rules database and identifying a network flow metadata processing rule to apply to the network flow metadata. The method further includes processing, by the network packet broker, the network flow metadata using the network flow metadata processing rule. The method further includes forwarding, by the network packet broker and based on results of the processing, egress network flow metadata to a network tool.

15 Claims, 9 Drawing Sheets

(56) References Cited

U.S. PATENT DOCUMENTS

| | | |
|---|---|---|
| 7,373,412 B2 | 5/2008 | Colas et al. |
| 7,421,506 B2 | 9/2008 | Ni et al. |
| 7,562,213 B1 | 7/2009 | Timms |
| 7,634,650 B1 | 12/2009 | Shah et al. |
| 8,270,942 B2 | 9/2012 | Zabawskyj et al. |
| 8,457,126 B2 | 6/2013 | Breslin et al. |
| 8,514,756 B1 | 8/2013 | Ramachandra et al. |
| 8,566,247 B1 | 10/2013 | Nagel et al. |
| 8,595,835 B2 | 11/2013 | Kolton et al. |
| 8,654,974 B2 | 2/2014 | Anderson et al. |
| 8,881,282 B1 | 11/2014 | Aziz et al. |
| 8,929,356 B2 | 1/2015 | Pandey et al. |
| 8,964,537 B2 * | 2/2015 | Brolin ................ H04L 47/31 370/230 |
| 9,065,642 B2 | 6/2015 | Zaverucha et al. |
| 9,298,560 B2 | 3/2016 | Janakiraman et al. |
| 9,380,002 B2 | 6/2016 | Johansson et al. |
| 9,392,010 B2 | 7/2016 | Friedman et al. |
| 9,660,913 B2 | 5/2017 | Newton |
| 9,680,869 B2 | 6/2017 | Buruganahalli et al. |
| 9,800,560 B1 | 10/2017 | Guo et al. |
| 9,807,121 B1 | 10/2017 | Levy et al. |
| 9,860,154 B2 * | 1/2018 | Balabine ............. H04L 63/102 |
| 9,882,929 B1 | 1/2018 | Ettema et al. |
| 9,893,883 B1 | 2/2018 | Chaubey et al. |
| 9,998,955 B1 * | 6/2018 | MacCarthaigh ....... H04L 45/74 |
| 10,079,843 B2 | 9/2018 | Friedman et al. |
| 10,116,553 B1 * | 10/2018 | Penno ................. H04L 45/306 |
| 10,291,651 B1 | 5/2019 | Chaubey |
| 10,326,741 B2 | 6/2019 | Rothstein et al. |
| 10,404,597 B2 | 9/2019 | Bakshi |
| 10,419,965 B1 * | 9/2019 | Kadosh ............. H04L 61/2592 |
| 10,482,239 B1 | 11/2019 | Liu et al. |
| 10,516,532 B2 | 12/2019 | Taub et al. |
| 10,749,808 B1 * | 8/2020 | MacCarthaigh ....... H04L 47/19 |
| 10,903,985 B2 | 1/2021 | Bergeron |
| 10,931,797 B2 | 2/2021 | Ahn et al. |
| 10,951,660 B2 | 3/2021 | Rogers et al. |
| 10,992,652 B2 | 4/2021 | Putatunda et al. |
| 11,075,886 B2 * | 7/2021 | Paul .................. H04L 63/0471 |
| 2002/0116485 A1 | 8/2002 | Black et al. |
| 2003/0004688 A1 | 1/2003 | Gupta et al. |
| 2003/0161335 A1 | 8/2003 | Fransdonk |
| 2003/0163684 A1 | 8/2003 | Fransdonk |
| 2003/0165241 A1 | 9/2003 | Fransdonk |
| 2004/0268148 A1 | 12/2004 | Karjala et al. |
| 2005/0050362 A1 | 3/2005 | Peles |
| 2005/0111437 A1 | 5/2005 | Maturi |
| 2006/0259579 A1 | 11/2006 | Beverly |
| 2007/0043940 A1 | 2/2007 | Gustave et al. |
| 2007/0078929 A1 | 4/2007 | Beverly |
| 2007/0156726 A1 * | 7/2007 | Levy .................. G06F 21/10 |
| 2007/0169190 A1 | 7/2007 | Kolton et al. |
| 2007/0179995 A1 * | 8/2007 | Prahlad .............. G06F 11/1464 |
| 2008/0005782 A1 | 1/2008 | Aziz |
| 2008/0031141 A1 | 2/2008 | Lean et al. |
| 2010/0250769 A1 | 9/2010 | Barreto et al. |
| 2011/0286461 A1 | 11/2011 | Ichino et al. |
| 2012/0082073 A1 | 4/2012 | Andreasen et al. |
| 2012/0210318 A1 | 8/2012 | Sanghvi et al. |
| 2012/0236823 A1 | 9/2012 | Kompella et al. |
| 2012/0304244 A1 | 11/2012 | Xie et al. |
| 2013/0054761 A1 | 2/2013 | Kempf et al. |
| 2013/0070777 A1 * | 3/2013 | Hutchison ............ H04L 45/28 370/412 |
| 2013/0117847 A1 * | 5/2013 | Friedman ............ H04L 63/102 726/22 |
| 2013/0204849 A1 * | 8/2013 | Chacko ................ G06F 3/0641 707/692 |
| 2013/0239119 A1 | 9/2013 | Garg et al. |
| 2013/0265883 A1 | 10/2013 | Henry et al. |
| 2013/0272136 A1 | 10/2013 | Ali et al. |
| 2013/0301830 A1 | 11/2013 | Bar-El et al. |
| 2014/0010083 A1 * | 1/2014 | Hamdi ................ H04L 47/10 370/235 |
| 2014/0059200 A1 * | 2/2014 | Nguyen ............... H04L 43/026 709/224 |
| 2014/0082348 A1 | 3/2014 | Chandrasekaran et al. |
| 2014/0115702 A1 | 4/2014 | Li et al. |
| 2014/0189093 A1 | 7/2014 | Du Toit et al. |
| 2014/0189961 A1 * | 7/2014 | He ................... D06F 35/00 8/137 |
| 2014/0226820 A1 | 8/2014 | Chopra et al. |
| 2014/0351573 A1 | 11/2014 | Martini |
| 2015/0026313 A1 * | 1/2015 | Chawla ............. H04L 41/5035 709/220 |
| 2015/0039889 A1 | 2/2015 | Andoni |
| 2015/0052345 A1 | 2/2015 | Martini |
| 2015/0113132 A1 * | 4/2015 | Srinivas ............. H04L 41/0823 709/224 |
| 2015/0124622 A1 * | 5/2015 | Kovvali ............. H04L 67/1006 370/236 |
| 2015/0172219 A1 | 6/2015 | Johansson et al. |
| 2015/0264083 A1 * | 9/2015 | Prenger .............. H04L 63/1408 726/23 |
| 2015/0281954 A1 | 10/2015 | Warren |
| 2015/0288679 A1 | 10/2015 | Ben-Nun et al. |
| 2015/0295780 A1 | 10/2015 | Hsiao et al. |
| 2015/0319030 A1 * | 11/2015 | Nachum ............... H04L 43/00 370/250 |
| 2015/0341212 A1 | 11/2015 | Hsiao et al. |
| 2015/0379278 A1 * | 12/2015 | Thota ................ H04L 63/0428 713/189 |
| 2016/0014016 A1 * | 1/2016 | Guichard ............. H04L 45/64 709/226 |
| 2016/0019232 A1 * | 1/2016 | Lambright .......... G06F 16/1752 707/692 |
| 2016/0080502 A1 | 3/2016 | Yadav et al. |
| 2016/0105469 A1 | 4/2016 | Galloway et al. |
| 2016/0105814 A1 * | 4/2016 | Hurst ............... H04L 67/10 370/252 |
| 2016/0127517 A1 | 5/2016 | Shcherbakov et al. |
| 2016/0142440 A1 | 5/2016 | Qian et al. |
| 2016/0248685 A1 * | 8/2016 | Pignataro ............ H04L 45/64 |
| 2016/0277321 A1 | 9/2016 | Johansson et al. |
| 2016/0277971 A1 * | 9/2016 | Hamdi ................ H04L 45/306 |
| 2016/0294784 A1 | 10/2016 | Hopkins et al. |
| 2016/0344754 A1 * | 11/2016 | Rayapeta ........... H04L 63/1416 |
| 2017/0048328 A1 | 2/2017 | Korotaev et al. |
| 2017/0070531 A1 | 3/2017 | Huston, III et al. |
| 2017/0237640 A1 * | 8/2017 | Stocker .............. H04L 43/04 709/224 |
| 2017/0237719 A1 | 8/2017 | Schwartz et al. |
| 2017/0302554 A1 * | 10/2017 | Chandrasekaran ... H04L 41/142 |
| 2017/0339022 A1 * | 11/2017 | Hegde ................ H04L 41/142 |
| 2017/0364794 A1 | 12/2017 | Mahkonen et al. |
| 2018/0091421 A1 * | 3/2018 | Ma ..................... H04L 43/04 |
| 2018/0091427 A1 * | 3/2018 | Kumar ................ H04L 47/24 |
| 2018/0097787 A1 | 4/2018 | Murthy et al. |
| 2018/0097788 A1 | 4/2018 | Murthy |
| 2018/0097840 A1 | 4/2018 | Murthy |
| 2018/0124025 A1 | 5/2018 | Lam et al. |
| 2018/0176192 A1 | 6/2018 | Davis et al. |
| 2018/0198838 A1 | 7/2018 | Murgia et al. |
| 2018/0241699 A1 * | 8/2018 | Raney ................ H04L 43/026 |
| 2018/0278419 A1 | 9/2018 | Higgins et al. |
| 2018/0332078 A1 | 11/2018 | Kumar et al. |
| 2019/0028376 A1 * | 1/2019 | Ganapathy .......... H04L 43/026 |
| 2019/0058714 A1 * | 2/2019 | Joshi ................. H04L 9/3268 |
| 2019/0068564 A1 * | 2/2019 | Putatunda .......... H04L 63/1408 |
| 2019/0104437 A1 * | 4/2019 | Bartfai-Walcott ................... H04L 41/0896 |
| 2019/0116111 A1 * | 4/2019 | Izard ................. H04L 43/12 |
| 2019/0166049 A1 | 5/2019 | Bakshi |
| 2019/0205151 A1 * | 7/2019 | Suzuki ................ G06F 3/0604 |
| 2019/0205244 A1 * | 7/2019 | Smith ................. G06F 12/12 |
| 2019/0260794 A1 * | 8/2019 | Woodford .......... H04L 63/1433 |
| 2019/0303385 A1 | 10/2019 | Ching et al. |
| 2019/0373052 A1 * | 12/2019 | Pollitt ............... H04L 43/026 |
| 2020/0036610 A1 * | 1/2020 | Indiresan ........... H04L 45/745 |
| 2020/0053064 A1 | 2/2020 | Oprisan et al. |

(56) References Cited

U.S. PATENT DOCUMENTS

| | | | |
|---|---|---|---|
| 2020/0067700 A1* | 2/2020 | Bergeron | G06F 9/45558 |
| 2020/0076773 A1 | 3/2020 | Monat et al. | |
| 2020/0104052 A1* | 4/2020 | Vijayan | G06F 16/27 |
| 2020/0137021 A1* | 4/2020 | Janakiraman | H04L 63/08 |
| 2020/0137115 A1* | 4/2020 | Janakiraman | H04L 12/4633 |
| 2021/0083857 A1 | 3/2021 | Bergeron | |
| 2021/0111975 A1* | 4/2021 | Raney | H04L 41/5009 |
| 2021/0160275 A1* | 5/2021 | Anderson | H04L 63/1458 |
| 2021/0194779 A1* | 6/2021 | Punj | H04L 43/026 |

OTHER PUBLICATIONS

Hardegen et al., "Flow-based Throughput Predication using Deep Learning and Real-World Network Traffic", 2019 (Year: 2019).*

Lee et al., "Towards Scalable Internet Traffic Measurement and Analysis with Dadoop", 2013 (Year: 2013).*

Zou et al., "An Enhanced Netflow Data Collection System", 2012 (Year: 2012).*

He et al., "Data deduplication techniques", 2010 (Year: 2010).*

Stankovic, "How to solve duplicated NetFlow caused by multiple exporters," https://www.netvizura.com/blog/how-to-solve-duplicated-netflow-caused-by-multiple-exporters, pp. 1-4 (Accessed Jan. 15, 2020).

"Jumbo Frame," Wikipedia, https://en.wikipedia.org/wiki/Jumbo_frame, pp. 1-4 (Jan. 15, 2020).

"How is the MTU is 65535 in UDP but ethernet does not allow frame size more that 1500 bytes," ServerFault, TCPIP, pp. 1-9 (Accessed Jan. 15, 2020).

"Network Monitoring Step 2: The Next-Generation of Packet Brokers," MantisNet, pp. 1-6 (2020).

"cPacket cVu 2440NG/3240NG," https://www.cpacket.com/resources/cvu-3240-2440-datasheet/, pp. 1-4 (Accessed Jan. 15, 2020).

"What are Microservices," An Introduction to Microservices, https://opensource.com/resources/what-are-microservices, pp. 1-8 (Accessed Jan. 15, 2020).

"IPv6," Wikipedia, https://en.wikipedia.org/wiki/IPv6, pp. 1-15 (Jan. 8, 2020).

"About NetFlow," Watchguard Technologies, Inc., pp. 1-3 (2019).

Non-Final Office Action for U.S. Appl. No. 15/980,699 (dated Dec. 9, 2019).

"Multiprotocol Label Switching," Wikipedia, https://en.wikipedia.org/wiki/multiprotocol_label_switching, pp. 1-7 (Dec. 6, 2019).

"Netflow," Wikipedia, https://en.wikipedia.org/wiki/NetFlow, pp. 1-9 (Dec. 3, 2019).

"NetFlow Collector," Kentipedia, Kentik, pp. 1-4 (Sep. 17, 2019).

Nubeva, "Nubeva TLS Decrypt: Out-of-Band Decrypted Visibility for the Cloud," www.nubeva.com/decryption, pp. 1-8 (Sep. 2019).

Nubeva, "What is Symmetric Key Intercep Architecture?" https://www.nubeva.com/blog/what-is-symmetric-key-intercept-architecture, pp. 1-4 (Aug. 8, 2019).

Notice of Allowance and Fee(s) Due for U.S. Appl. No. 15/826,787 (dated Apr. 25, 2019).

Petryschuk, "NetFlow Basics: An Introduction to Monitoring Network Traffic," Auvik, https://www.auvik.com/, pp. 1-8 (Mar. 19, 2019).

"Automatic versus Manual NetFlow Deduplication," Noction, https://www.noction.com/blog/automatic-manual-netflow-deduplication, pp. 1-7 (Feb. 1, 2019).

Non-Final Office Action for U.S. Appl. No. 15/826,787 (dated Jan. 3, 2019).

Leskiw, "Understanding Syslog: Servers, Messages & Security," https://www.networkmanagementsoftware.com/what-is-syslog/, pp. 1-7 (Oct. 2018).

Commonly-assigned, co-pending U.S. Appl. No. 16/113,360 for "Monitoring Encrypted Network Traffic Flows in a Virtual Environment Using Dynamic Session Key Acquisition Techniques," (Unpublished, filed Aug. 27, 2018).

McGillicuddy, "Next-Generation Network Packet Brokers: Defining the Future of Network Visibility Fabrics," Enterprise Management Associates (EMA) Research, Niagara Networks, pp. 1-27 (Aug. 2018).

Schulist et al., "Linux Socket Filtering aka Berkeley Packet Filter (BPF)," Wayback Machine, https://www.kernel.org/doc/Documentation/networking/filter.txt, pp. 1-25 (Jun. 8, 2018).

Commonly-assigned, co-pending U.S. Appl. No. 15/980,699 for "Methods, Systems, and Computer Readable Media for Monitoring Encrypted Network Traffic Flows," (Unpublished, filed May 15, 2018).

"Principles of Chaos Engineering," https://principlesofchaos.org/?lang=ENcontent, pp. 1-3 (May 2018).

Solution Brief, "Smart Packet Brokering for Mobile Network Operators," Brocade, pp. 1 (Jul. 19, 2017).

"Network Visibility Network Packet Broker Comparison Table," Ixia, pp. 1-10 (2017).

Michael, "NetFlow Deduplication or Flow Deduplication," Plixer, pp. 1-5 (Dec. 3, 2016).

"Feature Brief: FlowVUE Application," Gigamon, pp. 1-3 (2016).

Vavilapalli et al., Cord Design Notes, "Cord Monitoring Service," pp. 1-14 (Mar. 14, 2016).

ACG Research, "Business Case for Brocade Network Analytics for Mobile Network Operators," pp. 1-11 (2015).

Starovoitov, "[PATCH net-next 6/6] samples: bpf: large eBPF program in C," lkml.org, https://lkml.org/lkml/2014/11/27/10, pp. 1-5 (Nov. 26, 2014).

Andreyev, "Introducing data center fabric, the next-generation Facebook data center network," Data Center Engineering, Networking & Traffic, Production Engineering, https://code.fb.com/production-engineering/introducing-data-center-fabric-the-next-generation-facebook-data-center-network/, pp. 1-10 (Nov. 14, 2014).

Corbet, "Extending extended BPF," LWN.net, https://lwn.net/Articles/603983/, pp. 1-4 (Jul. 2014).

Corbet, "BPF: the universal in-kernel virtual machine," LWN.net, https://lwn.net/Articles/599755/, pp. 1-3 (May 2014).

Git, "Linux Kernel Source Tree," https://git.kernel.org/pub/scm/linux/kernel/git/torvalds/linux.git/tree/samples/bpf/sockex2_kern.c, pp. 1-4 (2018).

Ixia Anue GTP Session Controller, Take Control of GTP Monitoring to Improve Customer QoE and Maximize Network ROI, Solution Brief, Document No. 915-6606-01 Rev. A, pp. 1-2 (Sep. 2013).

Ixia Network Visibility Solutions, Anue GTP Session Controller 7433, Product Specifications, Document No. 915-6504-01 Rev. B, pp. 1-3 (May 2013).

"cPacket Radically Simplifies How Data Center and Cloud Professionals Pinpoint Problems," BusinessWire, pp. 1-3 (Jan. 28, 2013).

Hale, "Netflow V9 Datagram Knowledge Series: Part 2—Netflow V9 Packet Header," Geek Speak, pp. 1-3 (Sep. 7, 2012).

"Understanding Flow and Packet Deduplication," Riverbed Technology, pp. 1-5 (2012).

"NetFlow Version 9 Flow-Record Format," Cisco Systems, pp. 1-12 (May 2011).

Notice of Allowance and Fee(s) Due for U.S. Appl. No. 15/608,369 (dated Aug. 19, 2020).

Advisory Action and AFCP 2.0 Decision for U.S. Appl. No. 15/608,369 (dated Jul. 1, 2020).

Advisory Action and AFCP 2.0 Decision for U.S. Appl. No. 15/980,699 (dated Jun. 30, 2020).

Non-Final Office Action for U.S. Appl. No. 16/113,360 (dated May 19, 2020).

Non-Final Office Action for U.S. Appl. No. 16/103,598 (dated May 11, 2020).

Final Office Action for U.S. Appl. No. 15/608,369 (dated Apr. 22, 2020).

Final Office Action for U.S. Appl. No. 15/980,699 (dated Apr. 20, 2020).

Paul, Santanu, "Network Visibility Component with Netflow Jumbo Frame Support," The IP.com Journal, pp. 1-8 (Aug. 2019).

Paul, Santanu, "Methods and Systems for Session-Aware Collection of Netflow Statistics," The IP.com Journal, pp. 1-5 (Jul. 2019).

(56) References Cited

OTHER PUBLICATIONS

Pandey, Shardendu; Johansson, Stefan Jan, "Network Packet Broker with Flow Segmentation Capability," The IP.com Journal, pp. 1-6 (Jul. 2019).
Paul, Santanu, "Network Packet Broker with Flow Segmentation Capability," The IP.com Journal, pp. 1-6 (Aug. 2019).
Paul, Santanu, "Custom Key Performance Indicator (KPI) Network Visibility System," The IP.com Journal, pp. 1-4 (Jul. 2019).
Paul, Santanu, "Self-Healing Network Visibility System," The IP.com Journal, pp. 1-5 (Jun. 2019).
Paul, Santanu, "Network Visibility System with Integrated Netflow Over Syslog Reporting Capability" The IP.com Journal, pp. 1-7 (Jan. 28, 2019).
Evans, David, "Network Packet Broker with Dynamic Filter Rules," The IP.com Journal, pp. 1-8 (Jun. 2018).
Notice of Allowance and Fee(s) Due for U.S. Appl. No. 15/980,699 (dated Feb. 8, 2021).
Notice of Allowance and Fee(s) Due and Examiner-Initiated Interview Summary for U.S. Appl. No. 16/113,360 (dated Oct. 15, 2020).
Non-Final Office Action for U.S. Appl. No. 15/980,699 (dated Sep. 22, 2020).
"The ABCs of Network Visibility," Ixia, pp. 1-57 (2017).
Sanchez, "Extended BPF and Data Plane Extensibility: An overview of networking and Linux," PLUMgrid, pp. 1-37 (2014).

\* cited by examiner

⊟ CISCO NETFLOW/IPFIX
  VERSION: 9
  COUNT: 1
  SYSUPTIME: 1114740924
  ⊞ TIMESTAMP: OCT 23, 2007 16:30:31.000000000
  FLOWSEQUENCE: 259637
  SOURCEID: 0

*FIG. 3*

METHODS, SYSTEMS, AND COMPUTER READABLE MEDIA FOR PROCESSING NETWORK FLOW METADATA AT A NETWORK PACKET BROKER

TECHNICAL FIELD

The subject matter described herein relates to processing network flow metadata. More particularly, the subject matter described herein relates to processing network flow metadata at a network packet broker.

BACKGROUND

Network packet brokers are used to aggregate packets from multiple sources, deduplicate packets, since the same packet may be captured in different places, filter packets, redirect packets to final destination, possibly replicate the packets to multiple destinations, and filter to selectively send packets. However, the input to network packet brokers has been limited to packets, and the processing performed by network packet brokers has been limited to processing packets.

In addition to packet flows, another type of network data generated by network devices is network flow metadata, one example of which is NetFlow. NetFlow is a statistical, flow-by-flow summary of packet data at a higher level than raw packet data. If two network hosts communicate with each other, instead of generating a copy of every packet, NetFlow provides statistics about the overall conversation. NetFlow is a collection of conversations and reporting statistics about each conversation.

Many network devices can produce NetFlow statistics. Typically, a network operator configures a NetFlow collector as a destination, and sets the NetFlow collector as the destination for NetFlow data generated by a device that generates NetFlow records. This configuration is analogous to the configuration of a switch port analyzer (SPAN) port on a network device, such as a router. A SPAN port is typically configured with a destination for network packets copied by the router to the SPAN port.

Configuring a NetFlow generator or a SPAN port to forward packets to a single destination has a number of limitations. For example, it may be desirable to forward the same NetFlow statistics or packet copies to multiple destinations, which is not allowed by a device that allows only a single NetFlow or SPAN port destination to be configured. In another example, it may be desirable to feed two NetFlow collectors with NetFlow data from different switches. If the two switches see the same packet flow, NetFlow records will be duplicated, which may result in wasting of storage and processing resources of network tools that utilize data in NetFlow records. In another example, it may be desirable to redirect NetFlow records to a different destination when a primary NetFlow destination fails. Such redirection must be performed manually in a device that allows only a single configured NetFlow destination. These problems are magnified when NetFlow records are provided by multiple switches, requiring manual reconfiguration of the destination on each switch.

In light of these and other difficulties, there exists a need for methods, systems, and computer readable media for providing for network flow metadata processing at a network packet broker.

SUMMARY

A method for network flow metadata processing at a network packet broker includes receiving, as input at the network packet broker, network flow metadata, the network flow metadata including a network flow statistic generated by a network device regarding packets in the network flow. The method further includes accessing, by the network packet broker, a network flow metadata processing rules database and identifying a network flow metadata processing rule to apply to the network flow metadata. The method further includes processing, by the network packet broker, the network flow metadata using the network flow metadata processing rule. The method further includes forwarding, by the network packet broker and based on results of the processing, egress network flow metadata to a network tool.

According to another aspect of the subject matter described herein, receiving the network flow metadata includes receiving at least two copies of the same network flow metadata record, identifying a network flow metadata processing rule includes identifying a network flow metadata deduplication processing rule to apply to the at least two copies of the same network flow metadata record, processing the network flow metadata includes performing deduplication processing of the at least two copies of the same network flow metadata record, and forwarding the egress network flow metadata includes forwarding a single copy of the same network flow metadata processing record to a single tool port.

According to another aspect of the subject matter described herein, receiving the network flow metadata includes receiving a single network flow metadata record, identifying a network flow metadata processing rule includes identifying a network flow metadata replication rule to apply to the single network flow metadata record, processing the network flow metadata record includes replicating the single network flow metadata record, and forwarding the egress network flow metadata includes forwarding at least two copies of the single network flow metadata record to at least two different network tools.

According to another aspect of the subject matter described herein, receiving the network flow metadata includes receiving an encrypted network flow metadata record, identifying the network flow metadata processing rule includes identifying a network flow metadata decryption, processing, and re-encryption rule to apply to the network flow metadata, processing the network flow metadata includes decrypting the network flow metadata record a decryption key obtained via a secure backchannel interface to produce a decrypted network metadata record, performing at least one operation on the decrypted network flow metadata record, re-encrypting the decrypted network flow metadata record to produce a re-encrypted network flow metadata record, and forwarding the egress network flow metadata includes forwarding the re-encrypted network metadata flow record to the network tool.

According to another aspect of the subject matter described herein, performing at least one operation on the decrypted network flow metadata record includes performing at least one of: network flow metadata deduplication, replication, aggregation, and format translation processing on the decrypted network flow metadata record.

According to another aspect of the subject matter described herein, receiving packet copies and network flow log data, wherein identifying a network flow metadata processing rule includes identifying a network flow metadata aggregation rule to apply to the network flow metadata, the packet copies, and the network flow log data, wherein processing the network flow metadata includes aggregating the network flow metadata with at least one of the packet copies and the network flow log data to create an aggregated network flow metadata record, and wherein forwarding the egress network flow metadata includes forwarding the aggregated network flow metadata record to the network tool.

According to another aspect of the subject matter described herein, receiving the network flow metadata includes receiving a network flow metadata record formatted according to a first network flow metadata format, identifying the network flow metadata processing rule includes identifying a network flow metadata format translation rule to apply to the network flow metadata record, processing the network flow metadata includes translating a format of the network flow metadata from the first network flow metadata format to a second network flow metadata format different from the first network flow metadata format to produce a translated network flow metadata record, and forwarding the egress network flow metadata includes forwarding the translated network flow metadata record to the network tool.

According to another aspect of the subject matter described herein, the first network flow metadata format comprises a first network flow metadata record format and the second network flow metadata format includes a second network flow metadata record format different from the first network flow metadata record format and wherein translating the format of the network flow metadata includes translating the format of the network flow metadata from first network flow metadata record format to the second network flow metadata record format.

According to another aspect of the subject matter described herein, receiving the network flow metadata from a network device includes receiving network flow metadata records from a network tap or a tap or span port on a router or switch.

According to yet another aspect of the subject matter described herein, forwarding the network flow metadata to a network tool includes forwarding the network flow metadata to a network flow metadata collector.

According to another aspect of the subject matter described herein, a system for network flow metadata processing includes a network packet broker including at least one processor and a memory. The system further includes a network flow metadata processing rules database stored in the memory and containing rules for processing network flow metadata. The system further includes a network flow metadata processing engine implemented by the at least one processor for receiving network flow metadata as input, the network flow metadata including a network flow statistic generated by a network device regarding packets in the network flow, for accessing the network flow metadata processing rules database and identifying a network flow metadata processing rule to apply to the network flow metadata, for processing the network flow metadata using the network flow metadata processing rule, and for forwarding, based on results of the processing, egress network flow metadata to a network tool.

According to another aspect of the subject matter described herein, the network flow metadata processing engine is configured to receive at least two copies of the same network flow metadata record, identify a network flow metadata deduplication processing rule to apply to the at least two copies of the same network flow metadata record, perform deduplication processing of the at least two copies of the same network flow metadata record, and forward a single copy of the same network flow metadata processing record to a single tool port.

According to another aspect of the subject matter described herein, the network flow metadata processing engine is configured to receive a single network flow metadata record, identify a network flow metadata replication rule to apply to the single network flow metadata record, replicate the single network flow metadata record, and forward at least two copies of the single network flow metadata record to at least two different network tools.

According to another aspect of the subject matter described herein, the network flow metadata processing engine is configured to receive an encrypted network flow metadata record, identify a network flow metadata decryption, processing, and re-encryption rule to apply to the network flow metadata, decrypt the network flow metadata record a decryption key obtained via a secure backchannel interface to produce a decrypted network metadata record, perform at least one operation on the decrypted network flow metadata record, re-encrypt the decrypted network flow metadata record to produce a re-encrypted network flow metadata record, and forward the re-encrypted network metadata flow record to the network tool.

According to another aspect of the subject matter described herein, the network flow metadata processing engine is configured to perform at least one of: network flow metadata deduplication, replication, aggregation, enrichment, and format translation processing on the decrypted network flow metadata record.

According to another aspect of the subject matter described herein, the network flow metadata processing engine is configured to receive packet copies and network flow log data, identify a network flow metadata aggregation rule to apply to the network flow metadata, the packet copies, and the network flow log data, aggregate the network flow metadata with at least one of the packet copies and the network flow log data to create an aggregated network flow metadata record, and forward the aggregated network flow metadata record to the network tool.

According to another aspect of the subject matter described herein, the network flow metadata processing engine is configured to receive a network flow metadata record formatted according to a first network flow metadata format, identify a network flow metadata format translation rule to apply to the network flow metadata record, translate a format of the network flow metadata from the first network flow metadata format to a second network flow metadata format different from the first network flow metadata format to produce a translated network flow metadata record, and forward the translated network flow metadata record to the network tool.

According to another aspect of the subject matter described herein, the first network flow metadata format comprises a first network flow metadata record format and the second network flow metadata format includes a second network flow metadata record format different from the first network flow metadata record, and the network flow metadata processing engine is configured to translate the network flow metadata from the first network flow metadata record format to the second network flow metadata record format.

According to another aspect of the subject matter described herein, the network flow metadata processing engine is configured to receive NetFlow records from a network tap or a tap or SPAN port on a router or switch and to forward the network flow metadata to a NetFlow collector.

According to another aspect of the subject matter described herein, a non-transitory computer readable medium having stored thereon executable instructions that when executed by a processor of a computer control the computer to perform steps is provided. The steps include receiving, as input at the network packet broker, network flow metadata, the network flow metadata including a network flow statistic generated by a network device regarding packets in the network flow. The steps further include accessing, by the network packet broker, a network flow metadata processing rules database and identifying a network flow metadata processing rule to apply to the network flow metadata. The steps further include processing, by the network packet broker, the network flow metadata using the network flow metadata processing rule. The steps further include forwarding, by the network packet broker and based on results of the processing, egress network flow metadata to a network tool.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 3 is a diagram illustrating exemplary parameters in a NetFlow/IP flow information export (IPFIX) packet header;

DETAILED DESCRIPTION

Some network devices, such as switches, routers, and network taps, include a client/process that generates and exports NetFlow records to a single destination. These records are sent to a NetFlow collector, which then provides the records to analyzers and users (e.g., via a front-end user interface (UI), etc.).

Figure 1:
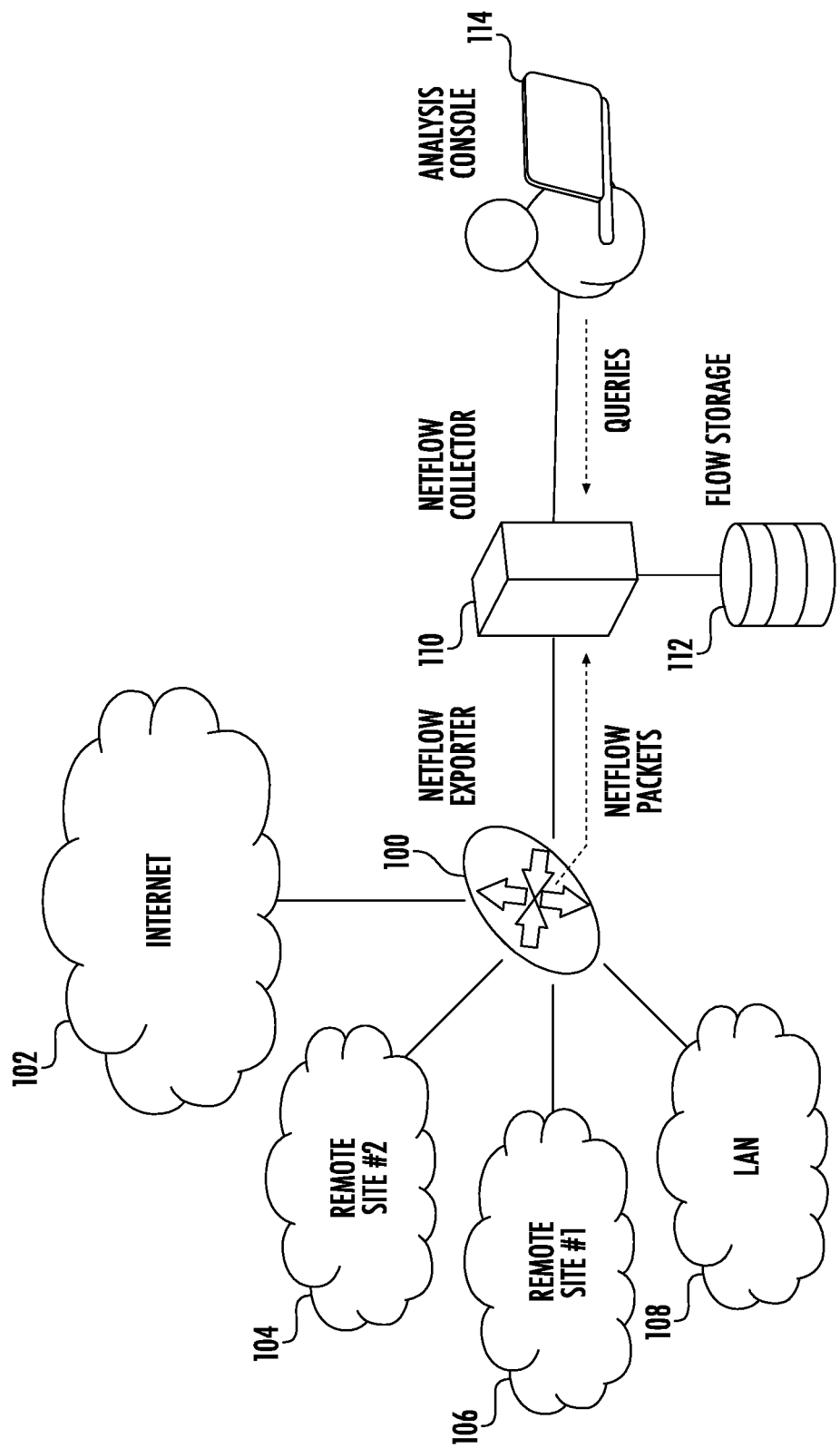
FIG. 1 is a network diagram illustrating conventional NetFlow collection.

FIG. 1 is a block diagram illustrating a NetFlow data collection architecture. In FIG. 1, a NetFlow exporter 100 is a device, such as a network tap, that generates NetFlow records from packets flowing through various computer networks 102, 104, 106, and 108. NetFlow exporter 100 exports the NetFlow packets to a NetFlow collector 110, which stores the records in storage 112. An analysis console 114 analyzes the NetFlow records stored in flow storage 112 to make network planning and other operational decisions.

One problem with the architecture illustrated in FIG. 1 is that it is not flexible. NetFlow collector 110 is configured as the sole destination for NetFlow exporter 100. It may be desirable to export NetFlow records to more than one NetFlow collector. In another example, it may be desirable to perform the duplication or other processing on NetFlow or other network metadata records. The architecture illustrated in FIG. 1 does not provide these and other capabilities.

Export of NetFlow Records

A network device, such as a router, will output a NetFlow record when the router determines that the flow is finished. The router does this by flow aging: when the router sees new traffic for an existing flow it resets the aging counter. Also, transmission control protocol (TCP) session termination in a TCP flow causes the router to expire the flow. Routers can also be configured to output a flow record at a fixed interval even if the flow is still ongoing.

NetFlow Packet Transport Protocol

NetFlow records are traditionally exported using user datagram protocol (UDP) and collected using a NetFlow collector. The IP address of the NetFlow collector and the destination UDP port must be configured on the sending router. A common value is UDP port 2055, but other values like 9555 or 9995, 9025, 9026 etc. can also be used. As stated above, however, most routers only allow a single NetFlow destination to be configured, and the configuration is static, requiring manual reconfiguration to change the destination for NetFlow records.

Figure 2:
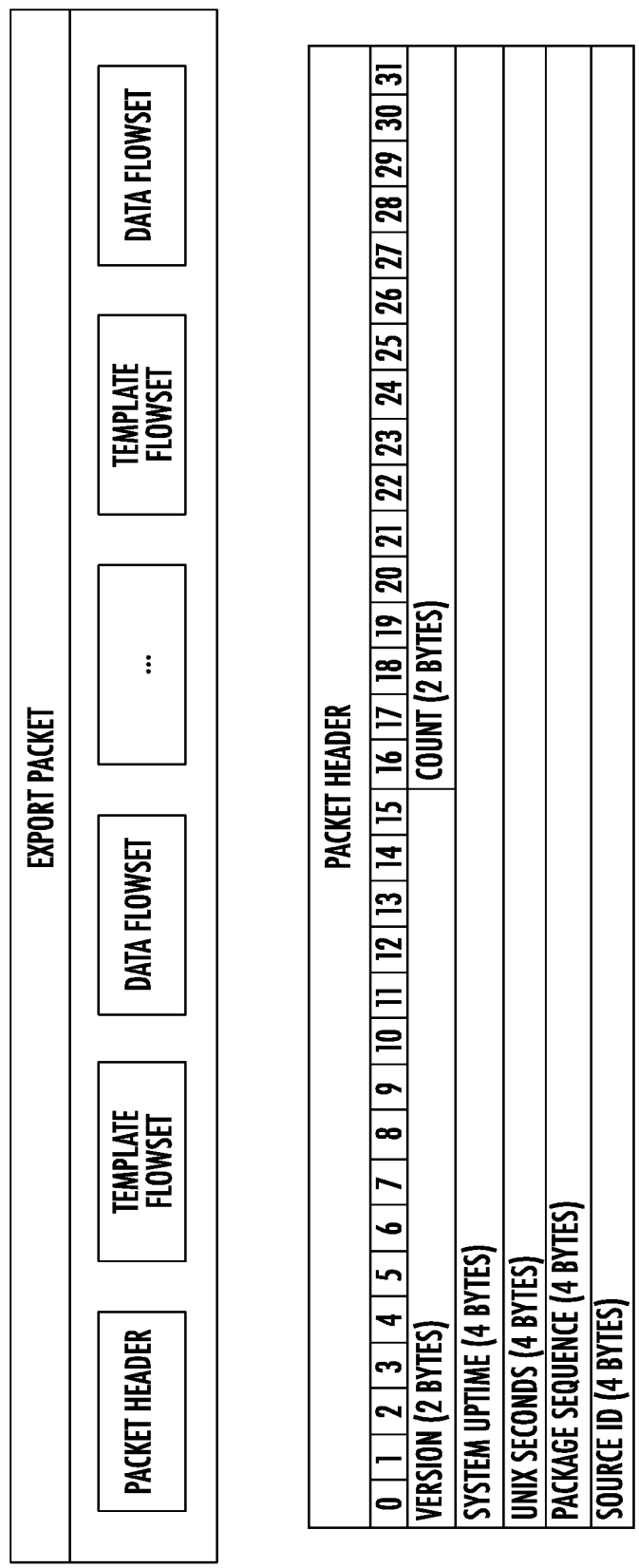
FIG. 2 is a block diagram illustrating an exemplary NetFlow packet structure.

NetFlow records are carried in export packets (which are carried in UDP datagrams). FIG. 2 is a block diagram illustrating an exemplary format for a NetFlow export packet. More particularly, the top portion of FIG. 2 illustrates the overall configuration of a NetFlow export packet and the bottom portion of FIG. 2 illustrates the fields in the packet header of the NetFlow export packet. It should be noted that the NetFlow export packet includes one or more template flow sets and data flow sets which contain statistics generated by the NetFlow exporter regarding network packet flows. A flow set is a generic name for a collection of records that follow the packet header in the export packet. A template flow set is a set of template records that define the format for data flow records that follow the template flow set in the export packet. A data flow set is a collection of one or more data records that contain statistics about network packet flows.

The NetFlow packet header includes a version identifier that identifies the NetFlow version, a system uptime field that indicates how long the NetFlow exporter has been running, a Unix seconds field that indicates the number of seconds that have elapse since the start of coordinated universal time, a package sequence field stores a sequence number for the NetFlow packet, and a source ID field, which stores an identifier of the source of the NetFlow export packet.

FIG. 3 illustrates exemplary values for the fields that may appear in a NetFlow or IP flow information export (IPFIX) packet header. The fields include the NetFlow version, a packet count, system uptime, timestamp, flow sequence number, and sequence ID.

For efficiency reasons, the router traditionally does not keep track of flow records already exported, so if a NetFlow packet is dropped due to network congestion or packet corruption, all contained records are lost forever. The UDP protocol does not inform the router of the loss so it can send the packets again. This can be a real problem, especially with NetFlow v8 or v9 that can aggregate a lot of packets or flows into a single record. A single UDP packet loss can cause a huge impact on the statistics of some flows. That is why some modern implementations of NetFlow use the stream control transmission protocol (SCTP) to export packets so as to provide some protection against packet loss, and make sure that NetFlow v9 templates are received before any related record is exported. Note that TCP would not be suitable for NetFlow because a strict ordering of packets would cause excessive buffering and delays.

The problem with SCTP is that it requires interaction between each NetFlow collector and each router exporting NetFlow. There may be performance limitations if a router has to deal with many NetFlow collectors, and a NetFlow collector has to deal with lots of routers, especially when some of them are unavailable due to failure or maintenance.

SCTP may not be efficient if NetFlow must be exported toward several independent collectors, some of which may be test servers that can go down at any moment. UDP allows simple replication of NetFlow packets using Network taps or L2 or L3 Mirroring. Simple stateless equipment can also filter or change the destination address of NetFlow UDP packets if necessary. Since NetFlow export almost only use network backbone links, packet loss will often be negligible. If it happens, it will mostly be on the link between the network and the NetFlow collectors.

NetFlow Record

A NetFlow record can contain a wide variety of information about the traffic in a given flow.

NetFlow version 5 (one of the most commonly used versions, followed by version 9) contains the following:
- Input interface index used by simple network management protocol (SNMP) (if Index in management information base (IF-MIB)).
- Output interface index or zero if the packet is dropped.
- Timestamps for the flow start and finish time, in milliseconds since the last boot.
- Number of bytes and packets observed in the flow
- Layer 3 headers:
    - Source and destination IP addresses
    - Internet control message protocol (ICMP) Type and Code.
    - IP protocol
    - Type of Service (ToS) value
- Source and destination port numbers for TCP, UDP, SCTP
- For TCP flows, the union of all TCP flags observed over the life of the flow.
- Layer 3 routing information:
    - IP address of the immediate next-hop (not the border gateway protocol (BGP) next hop) along the route to the destination
    - Source and destination IP masks (prefix lengths in the classless inter-domain routing (CIDR) notation)

NetFlow version 9 can include all of these fields and can optionally include additional information such as multiprotocol label switching (MPLS) labels and IPv6 addresses and ports.

By analyzing flow data, a picture of traffic flow and traffic volume in a network can be built.

The exemplary nomenclature may be used in describing NetFlow records:

Version
  The version of NetFlow records exported in this packet; for Version 9, this value is 0x0009
Count
  Number of FlowSet records (both template and data) contained within this packet
System Uptime
  Time in milliseconds since this device was first booted
UNIX Seconds
  Seconds since 0000 Coordinated Universal Time (UTC) 1970
Sequence Number
  Incremental sequence counter of all export packets sent by this export device; this value is cumulative, and it can be used to identify whether any export packets have been missed
    **Note: This is a change from the NetFlow Version 5 and Version 8 headers, where this number represented "total flows."
Source ID
  The Source ID field is a 32-bit value that is used to guarantee uniqueness for all flows exported from a particular device. (The Source ID field is the equivalent of the engine type and engine ID fields found in the NetFlow Version 5 and Version 8 headers). The format of this field is vendor specific. In the Cisco implementation, the first two bytes are reserved for future expansion, and will always be zero. Byte 3 provides uniqueness with respect to the routing engine on the exporting device. Byte 4 provides uniqueness with respect to the particular line card or Versatile Interface Processor on the exporting device. Collector devices should use the combination of the source IP address plus the Source ID field to associate an incoming NetFlow export packet with a unique instance of NetFlow on a particular device.

All NetFlow packets begin with version-dependent header that contains at least the following fields:
  Version number (v1, v5, v7, v8, v9)
  Sequence number to detect loss and duplication
  Timestamps at the moment of export, as system uptime or absolute time.
  Number of records (v5 or v8) or list of templates and records (v9)

The subject matter described herein includes network packet broker (NPB) that provides network packet broker features related to the processing of typical user plane packet traffic (e.g., mobile IP packet traffic transiting a cellular network, GTP packet traffic, etc.)—aggregate, deduplicate, replicate to multiple network tool destinations, on-the-fly changes to different network tool destinations, filter what each network tool destination gets, etc. The network packet broker described herein provides processing on NetFlow and other network flow metadata records. In one embodiment, the network packet broker described herein may emulate a NetFlow collector element.

The network packet broker may receive copies of NetFlow export records that are obtained from network taps, probes or SPAN ports in a monitored network. The network packet broker, in one processing example, may examine the received NetFlow records and determine whether a received NetFlow record is a duplicate of a NetFlow record previously received at the network packet broker. If the NetFlow record is determined to be a duplicate, then the duplicate NetFlow record is filtered out/dropped, as shown in FIG. 4.

Figure 4:
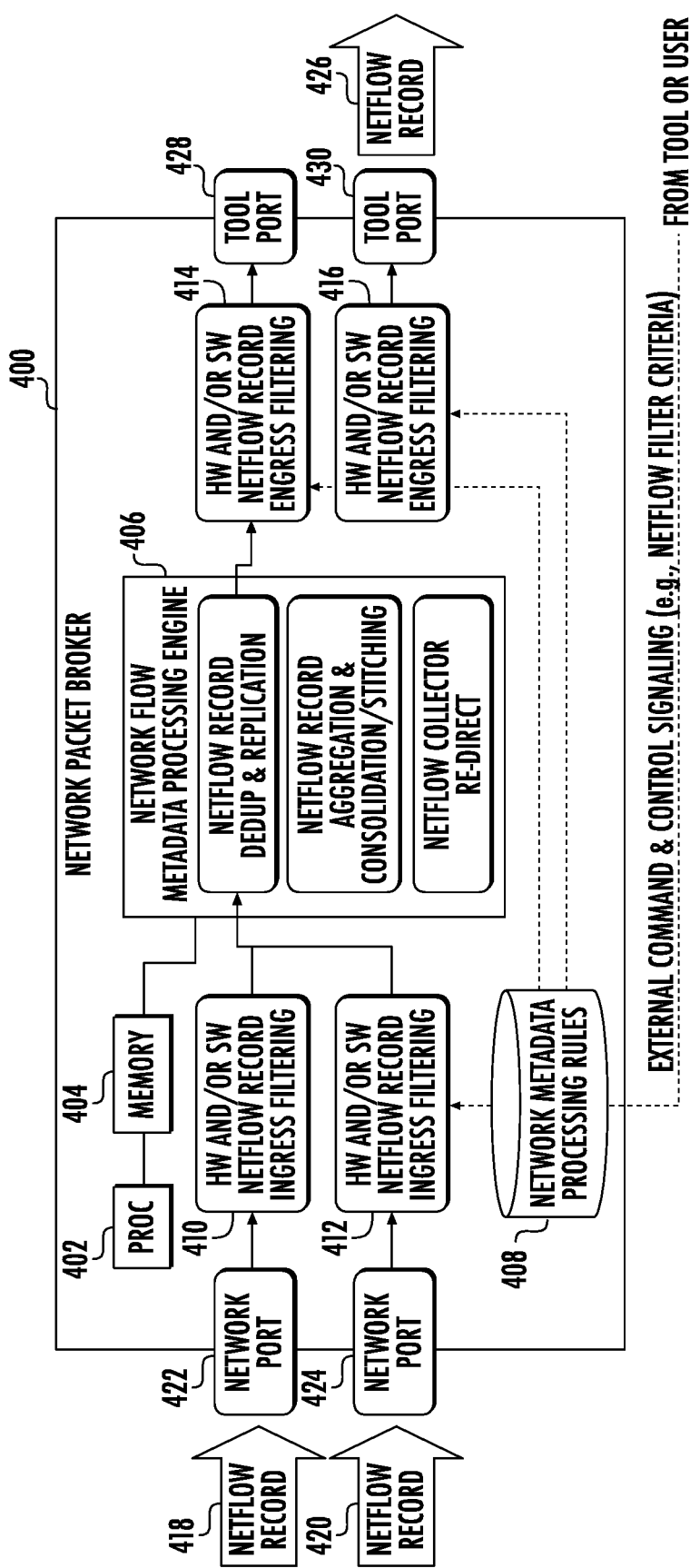
FIG. 4 is a block diagram illustrating a network packet broker with network flow metadata processing capabilities where the network packet broker performs deduplication of network flow metadata records.

More particularly, FIG. 4 illustrates an example of a network packet broker 400 that receives NetFlow records as input and performs deduplication processing on the NetFlow records. Network packet broker 400 illustrated in FIG. 4 includes at least one processor 402 and memory 404. A network flow metadata processing engine 406 may reside in memory 404 and the executed by processor 402 to perform various processing on network flow metadata and other network flow data received by network packet broker 400. In one example, network flow metadata processing engine 406 may access a network metadata processing rules database 408 to identify network metadata processing rules to apply to received network metadata. The result of the processing may be used to configure one or more ingress network metadata filters 410 and 412, one or more egress metadata filters 414 and 416, or to perform other processing on received NetFlow records.

In the illustrated example, duplicate copies 418 and 420 of the same NetFlow record are received on different network ports 422 and 424 of network packet broker 400. NetFlow records 418 and 420 may be generated by network taps or other network devices located in different locations but that produce the same NetFlow record. Network flow metadata processing engine 406 receives NetFlow records 418 and 420 and accesses database 408 to determine that deduplication processing is required. Network flow metadata processing engine 406 performs the deduplication processing and identifies that NetFlow records 418 and 420 are duplicates of the same record. Accordingly, network flow metadata processing engine 406 configures egress filters 414 and 416 such that only a single egress NetFlow record 426 is output on tool ports 428 or 430 of network packet broker 400. Egress NetFlow record 426 may be forwarded to a network tool, such as a NetFlow collector.

Figure 5:
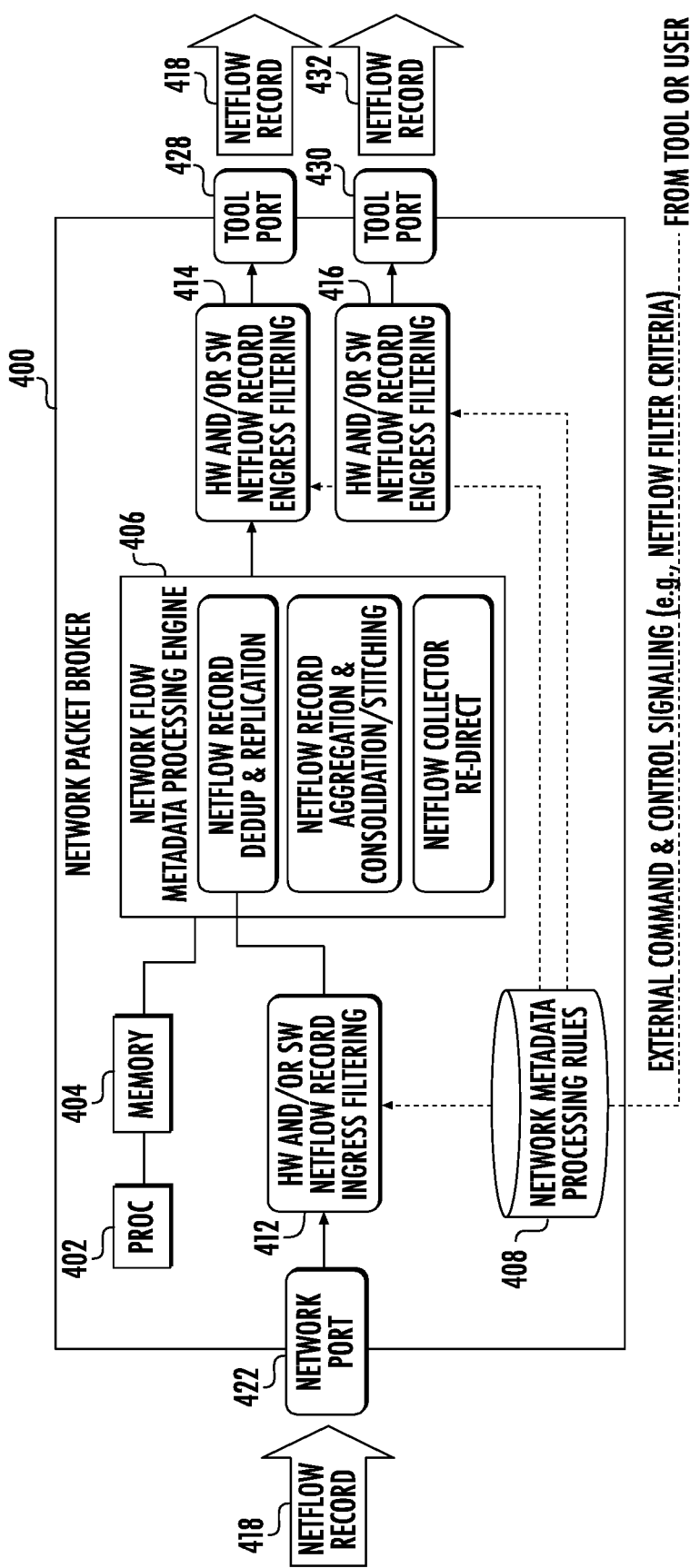
FIG. 5 is a block diagram illustrating the network packet broker with network flow metadata processing capabilities where the network packet broker replicates network flow metadata to different destinations.

FIG. 5 illustrates another example of network metadata processing that may be performed by network packet broker 400. In FIG. 5, network packet broker 400 receives a single NetFlow record 418 on network port 422. Network flow metadata processing engine 406 performs a lookup in network metadata processing rules database 408 and determines that replication processing is to be performed for the NetFlow record 418. Accordingly, network flow metadata processing engine 406 replicates NetFlow record 418 and forwards the NetFlow record 418 and the duplicate 432 of the NetFlow record 418 to network devices via egress filters 414 and 416 and tool ports 428 and 430. In one example, tool ports 428 and 430 may provide NetFlow feeds to different NetFlow collectors or other network tools.

Network packet broker 400 may implement and enforce various filtering criteria that are applied to received NetFlow records. Exemplary filtering criteria may include, but are not limited to, NetFlow version, count, system uptime, timestamp, sequence number, etc. These criteria may be provisioned by a human operator or may be dynamically provisioned via a machine-to-machine interface, where a network tool sends NetFlow filter criteria to network packet broker 400, and network packet broker 400 installs and implements the new NetFlow record filter criteria on the fly without human intervention.

Network packet broker 400 may receive multiple NetFlow records and to aggregate these NetFlow records and or consolidate or "stitch" NetFlow records with other NetFlow records and/or other network data. Examples of such aggregation will be described below with regard to FIG. 7.

Network packet broker 400 may receive a NetFlow record that is addressed to a first NetFlow collector and redirect the NetFlow record to a second NetFlow collector different from the first NetFlow collector. Such redirection may be done for the purposes of load balancing, failover, or recovery after a failover. For example, network packet broker 400 replicates NetFlow records to a single destination, as illustrated in FIG. 1, and that destination fails, network packet broker 400 may be configured with a secondary destination for the NetFlow records, and, upon detecting failure of the first NetFlow destination, may cease forwarding NetFlow records to the failed destination and begin forwarding NetFlow records to the new destination. Such redirection may occur automatically without the need for a human to provision the new destination for the NetFlow records. When the network packet broker 400 detects recovery of the primary NetFlow destination, network packet broker 400 may either automatically switch back to forwarding NetFlow records to the primary destination or may load balance NetFlow records between the primary and secondary destinations.

Figure 6:
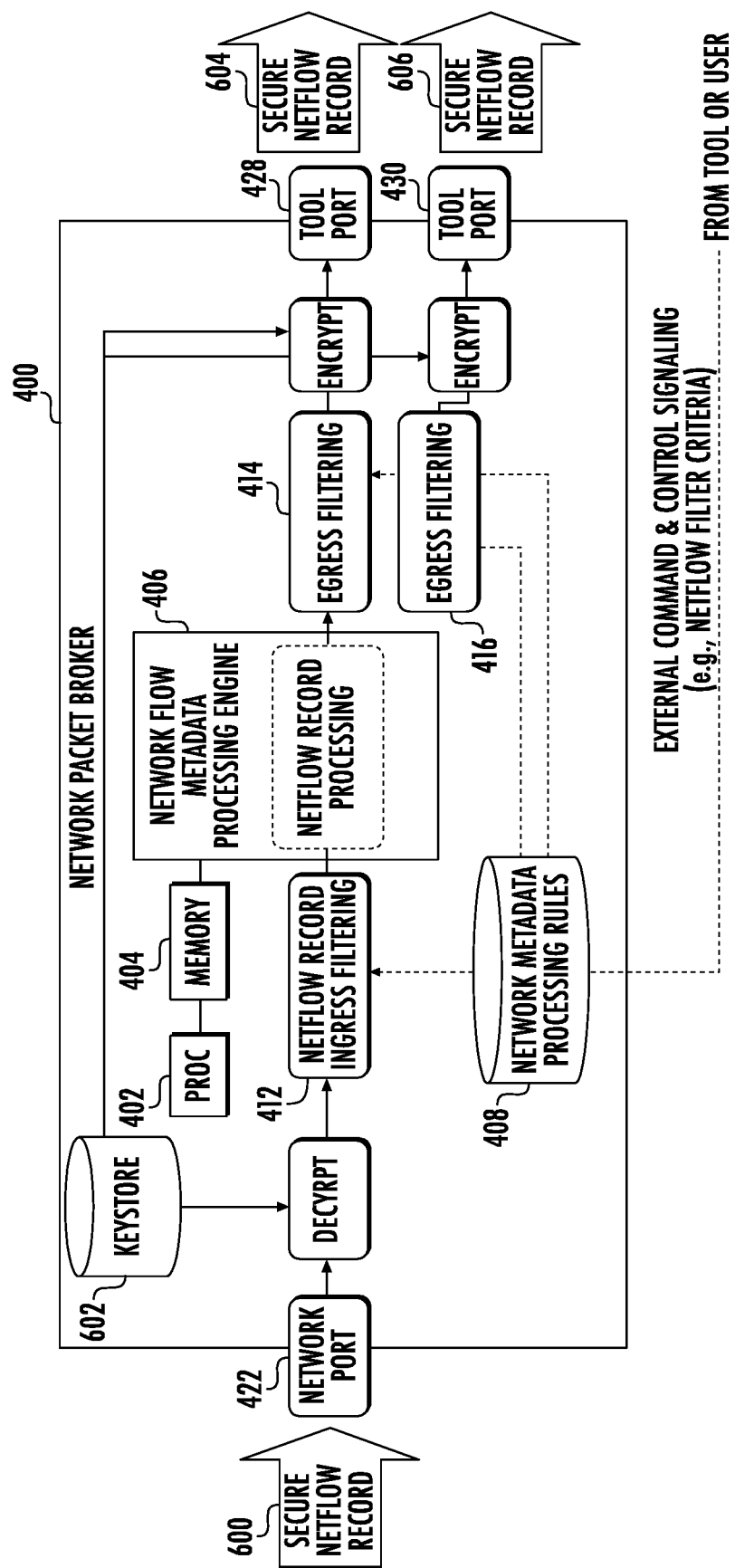
FIG. 6 is a block diagram illustrating a network packet broker with network flow metadata processing capabilities where the network packet broker performs decryption and re-encryption of network flow network flow metadata.

Network packet broker 400 may include the ability to receive and temporarily decrypt NetFlow records that are, for instance, being communicated securely via secure sockets layer/transport layer security (SSL/TLS) or other encryption protocols (FIG. 6). The decrypted NetFlow records may be processed as described previously in this disclosure, and subsequently re-encrypted prior to egress.

FIG. 6 illustrates an example where network packet broker 400 receives secure or encrypted NetFlow records 600 from a NetFlow producer. Network flow metadata processing engine 406 performs a lookup in network metadata processing rules database 408 and determines that decryption and re-encryption processing as well as replication may be required for the received secure NetFlow record. In one example, network flow metadata processing engine 406 may access one or more encryption and decryption keys stored in encryption and decryption key store 602. The encryption and decryption keys stored in encryption and decryption key store 602 may include decryption keys obtained via a secure back channel with an encrypted NetFlow record producer. The decrypted NetFlow record may be re-encrypted using different encryption keys specific to different network tool destinations. In the illustrated example, secure NetFlow records 604 and 606 may be sent to different network tools that have different security relationships with network packet broker 400.

It will be appreciated that although most of the examples described herein are based on the use of the NetFlow protocol, network packet broker 400 may receive as input and process other network flow metadata record formats, including jFlow (produced by Juniper Networks-compatible devices), rFlow (produced by Ericsson-compatible devices), sampled flow (sFlow), IPFIX, NetStream, etc. jFlow and rFlow are proprietary network metadata record formats generated by network devices of Juniper Networks, and Ericsson, respectively. sFlow is an industry standard for exporting packets. sFlow is standardized by the sFlow consortium at www.sFlow.org.

Figure 7:
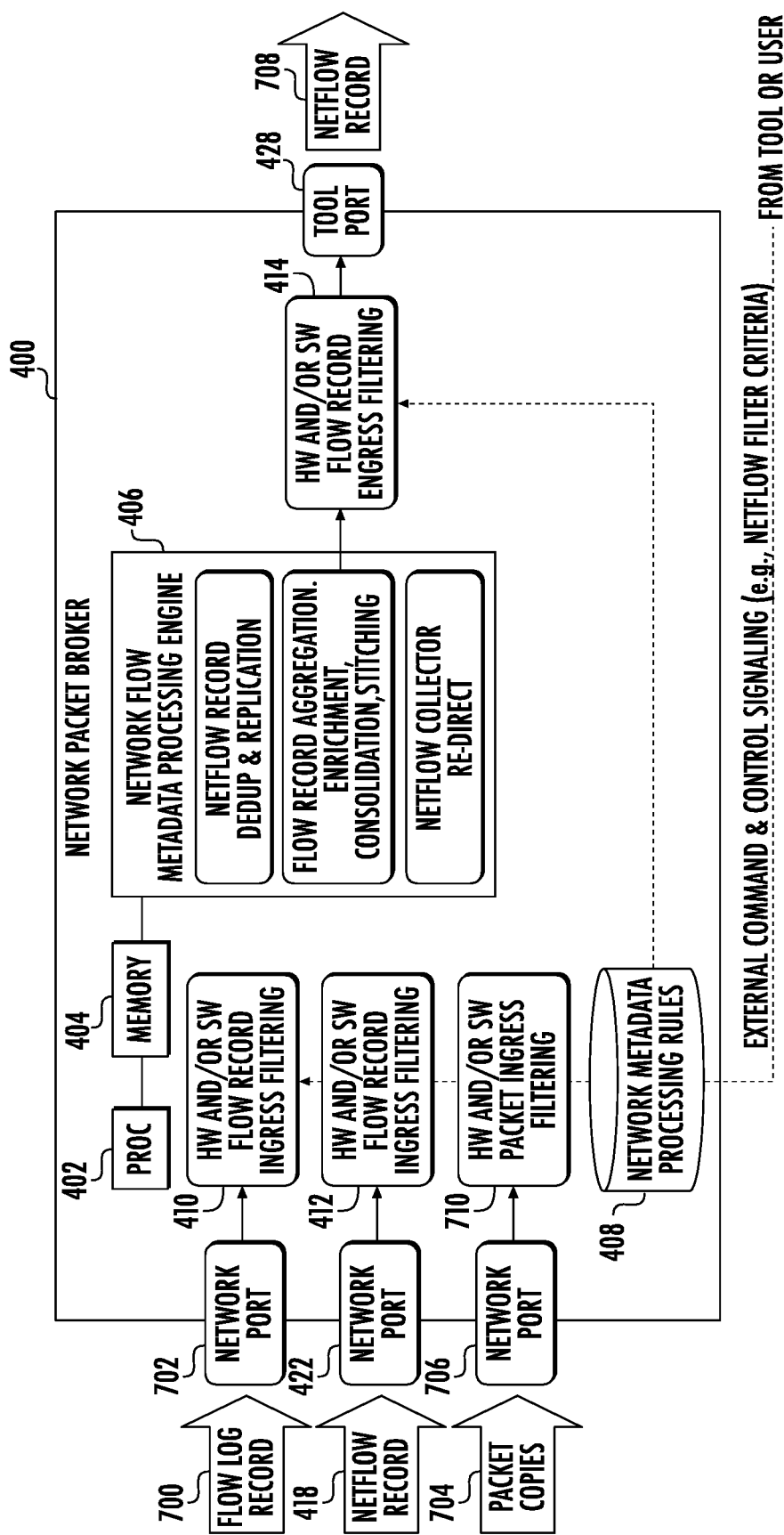
FIG. 7 is a block diagram of a network packet broker for with network flow metadata processing capabilities where the network packet broker aggregates network flow metadata with packet copies and network flow log file data.

In FIG. 7, network packet broker 400 includes the ability to receive any combination of packet copies, flow log data (e.g., virtual private cloud (VPC) flow log data, Zeek/Bro log data, etc.) and flow records (e.g., NetFlow, sFlow, IPFIX, IxFlow (an Ixia/Keysight network flow metadata record format), etc.) and perform consolidation processing operations that involve some or all of these ingress feeds. As used herein the term consolidation processing is intended to include processing operations that aggregate, enrich or combine/merge the information contain in multiple ingress feeds into a single network flow metadata format of the user's choosing (e.g., IxFlow, NetFlow, sFlow, etc.). For example, in FIG. 7, one ingress feed includes VPC flow log data 700, while another ingress feed includes NetFlow records 418, and yet another ingress feed includes unprocessed or raw packet copies 704 obtained from a monitored network. Network flow metadata processing engine 406 may access rules in network metadata processing rules database 408 for performing the desired aggregation, enrichment, stitching, etc. operations. The resulting flow record (e.g., IxFlow) that contains the consolidated and possibly enriched flow information is transmitted to a network tool via an egress port of network packet broker 400.

In general, network packet broker 400 may receive any flow data in any format (e.g., VPC flow logs), and merge or combine two or more different sources of data. Such combining can be referred to as flow enrichment. Flow enrichment can be in the form of combining two or more NetFlow streams, one NetFlow stream and other source of network metadata (e.g., Zeek/Bro logs). Network packet broker 400 may take packets/packet copies and network flow metadata as input, or VPC flow logs and an extended Berkeley packet filter (eBPF) agent metadata stream and output flow records (e.g., IxFlow, NetFlow, etc.).

In the architecture illustrated in FIG. 7, network packet broker 400 receives a NetFlow record 418 via network port 422. Network packet broker 400 also receives flow log data 700 via network port 702. Network packet broker 400 further receives packet copies 704 via network port 706. Network flow metadata processing engine 406 performs a lookup in network metadata processing rules database 408 and identifies a network metadata aggregation, enrichment, consolidation, and/or stitching rule to apply to the network flow metadata, the packet copies, and the flow log data. In the illustrated example, network flow metadata processing engine 406 produces an aggregated output flow record 708 that includes network metadata from NetFlow record 418, flow log data from flow log data 700, and/or packet copies from packet copy 704. Network flow metadata processing engine 406 may also configure one or more of ingress filters 410, 412, and 710 to apply ingress filter rules to input network metadata, packets, and/or flow log data. Network flow metadata processing engine 406 may also configure one or more egress filters 414 to filter egress network metadata, packets, and/or log data.

Figure 8:
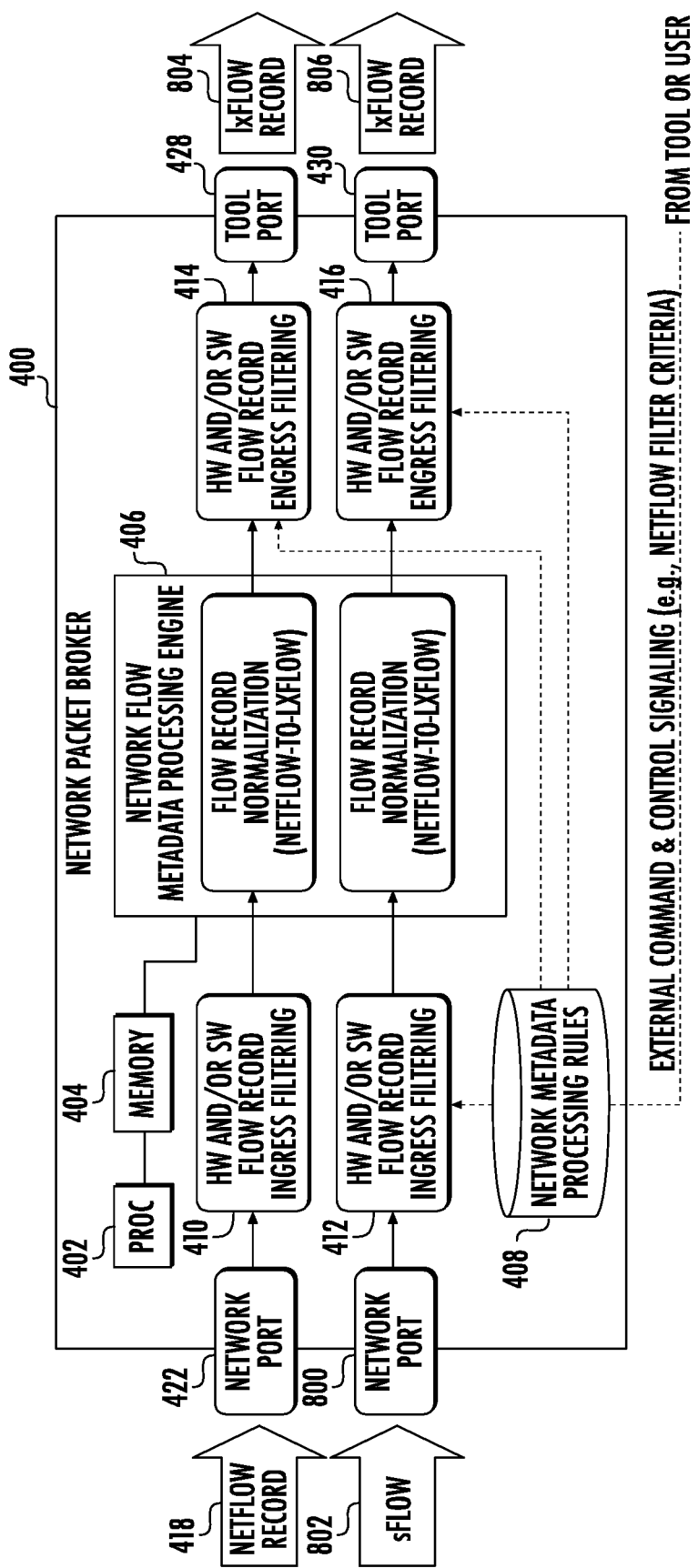
FIG. 8 is a block diagram illustrating a network packet broker with network flow metadata processing capabilities where the network packet broker performs normalization or translation of different network flow metadata record formats

FIG. 8 illustrates an example in which network packet broker 400 is configured to perform network metadata format translation or normalization. Network metadata format translation refers to translating network metadata from one format, such as NetFlow, to another format, such as IxFlow or sFlow. Network metadata format normalization involves translating network metadata formats from different input formats to a single normalized output format. Referring to FIG. 8, network port 422 receives a NetFlow record 418. Network port 800 receives an sFlow formatted record 802. Network metadata processing engine 406 accesses network metadata processing rules database 408 and determines that normalization or translation processing is to be applied to network flow records 418 and 802. In the illustrated example, records 418 and 802 are converted to a common output network flow metadata format. In FIG. 8, the common output network flow metadata format is IxFlow. Accordingly, network packet broker 400 outputs IxFlow records 804 and 806 to network tools via tool ports 428 and 430.

In one example, when translating from NetFlow to sFlow, network packet broker 400 may extract the network statistics in the NetFlow packets and insert the network statistics into sFlow datagrams.

Figure 9:
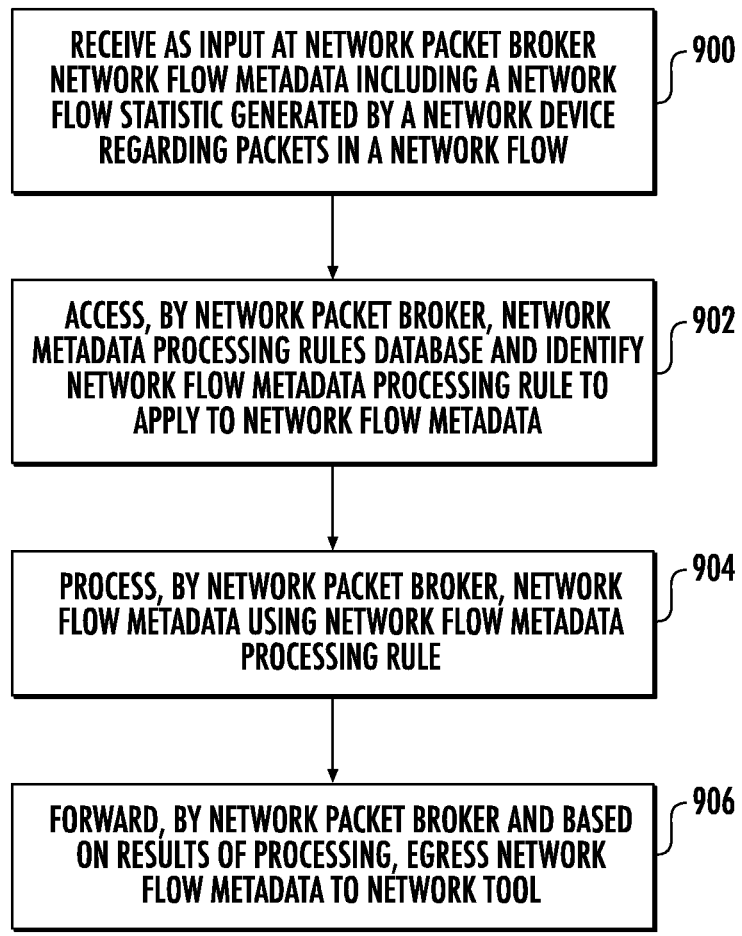
FIG. 9 is a flow chart illustrating an exemplary process for processing network flow metadata at a network packet broker.

FIG. 9 is a flow chart illustrating an exemplary process for performing network flow metadata processing at a network packet broker. Referring to FIG. 9, in step 900, the process includes receiving, as input at a network packet broker, a network flow metadata including a network flow statistic generated by a network device regarding packets in a network flow. For example, network packet broker 400 may receive NetFlow, IxFlow, sFlow, or other network metadata at one of its network ports. The network device that produces the network flow metadata may be a network tap, router, or switch configured to produce such records.

In step 902, the process includes, accessing, by the network packet broker, a network metadata processing rules database and identifying a network flow metadata processing rule to apply to network flow metadata. For example, network flow metadata processing engine 406 may perform a lookup in network metadata processing rules database 408 to identify one or more network metadata processing rules to apply to ingress network flow metadata. The lookup may be performed based on one or more parameters in the received network metadata record. For example, the source address and destination address may be used to extract a network metadata processing rule for a particular packet flow.

In step 904, the process includes processing, by the network packet broker, network flow metadata using the NetFlow flow metadata processing rules. For example, network flow metadata processing engine 406 may perform one or more of deduplication, replication, aggregation, enrichment, decryption and encryption, or other processing on ingress NetFlow data based on the rule or rules accessed in database 408.

In step 906, the process includes, forwarding, by the network packet broker and based on the results of the processing, egress network flow metadata to a network tool. For example, a network packet broker 400 may output deduplicated, replicated, aggregated, decrypted and re-encrypted, and/or enriched network metadata records to one or more network tools.

By placing network metadata processing functionality at a network packet broker, the inflexibility of the conventional NetFlow distribution architecture illustrated in FIG. 1 is avoided. For example, it is possible to redirect network flow metadata streams to different network tools when one network tool becomes unavailable without having to reconfigure the network metadata generators. It is also possible to apply network packet broker functions, such as deduplication, replication, and other functions to network metadata streams.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for processing network flow metadata at a network packet broker, the method comprising:

receiving, as input at a network port of the network packet broker, the network flow metadata, the network flow metadata including a network flow statistic generated by a network device regarding packets in a network flow, wherein the receiving the network flow metadata generated by the network device includes further receiving network flow metadata records from one of: a network tap, a tap port of a router, a tap port of a switch, a span port of the router, or a span port of the switch;

accessing, by the network packet broker, a network flow metadata processing rules database and identifying a network flow metadata processing rule to apply to the network flow metadata;

wherein the processing, by the network packet broker, the network flow metadata using the network flow metadata processing rule to produce or identify egress network flow metadata; and forwarding, by the network packet broker, the egress network flow metadata to a network tool, wherein the forwarding the egress network flow metadata to the network tool includes further forwarding the egress network flow metadata to a network flow metadata collector, wherein the receiving the network flow metadata includes further receiving at least two network flow metadata records, the identifying the network flow metadata processing rule includes further identifying a network flow metadata deduplication processing rule to apply to the at least two network flow metadata records, the processing network flow metadata includes performing deduplication processing of the at least two network flow metadata records, and the forwarding the egress network flow metadata includes further forwarding one of the at least two network flow metadata records to a single tool port.

2. A method for processing network flow metadata at a network packet broker, the method comprising:

receiving, as input at a network port of the network packet broker, the network flow metadata, the network flow metadata including a network flow statistic generated by a network device regarding packets in a network flow, wherein the receiving the network flow metadata generated by the network device includes further receiving network flow metadata records from one of: a network tap, a tap port of a router, a tap port of a switch, a span port of the router, or a span port of the switch;

accessing, by the network packet broker, a network flow metadata processing rules database and identifying a network flow metadata processing rule to apply to the network flow metadata;

wherein the processing, by the network packet broker, the network flow metadata using the network flow metadata processing rule to produce or identify egress network flow metadata; and forwarding, by the network packet broker, the egress network flow metadata to a network tool, wherein the forwarding the egress network flow metadata to the network tool includes further forwarding the egress network flow metadata to a network flow metadata collector, wherein the receiving the network flow metadata includes further receiving a single network flow metadata record, the identifying the network flow metadata processing rule includes further identifying a network flow metadata replication rule to apply to the single network flow metadata record, the processing the network flow metadata includes replicating the single network flow metadata record, and the forwarding the egress network flow metadata includes further forwarding at least two copies of the single network flow metadata record to at least two different network tools.

3. A method for processing network flow metadata at a network packet broker, the method comprising:

receiving, as input at a network port of the network packet broker, the network flow metadata, the network flow metadata including a network flow statistic generated by a network device regarding packets in a network flow, wherein the receiving the network flow metadata generated by the network device includes further receiving network flow metadata records from one of: a network tap, a tap port of a router, a tap port of a switch, a span port of the router, or a span port of the switch;

accessing, by the network packet broker, a network flow metadata processing rules database and identifying a network flow metadata processing rule to apply to the network flow metadata;

wherein the processing, by the network packet broker, the network flow metadata using the network flow metadata processing rule to produce or identify egress network flow metadata; and forwarding, by the network packet broker, the egress network flow metadata to a network tool, wherein the forwarding the egress network flow metadata to the network tool includes further forwarding the egress network flow metadata to a network flow metadata collector, wherein the receiving the network flow metadata includes further receiving an encrypted network flow metadata record, the identifying the network flow metadata processing rule includes further identifying a network flow metadata decryption, processing, and re-encryption rule to apply to the network flow metadata, the processing the network flow metadata includes decrypting the network flow metadata record using a decryption key obtained via a secure backchannel interface to produce a decrypted network metadata record, performing at least one operation on the decrypted network flow metadata record, re-encrypting the decrypted network flow metadata record to produce a re-encrypted network flow metadata record, and the forwarding the egress network flow metadata includes further forwarding the re-encrypted network metadata flow record to the network tool.

4. The method of claim 3 wherein the performing at least one operation on the decrypted network flow metadata record includes further performing at least one of: network flow metadata deduplication, replication, aggregation, and format translation processing on the decrypted network flow metadata record.

5. A method for processing network flow metadata at a network packet broker, the method comprising:

receiving, as input at a network port of the network packet broker, network flow metadata, the network flow metadata including a network flow statistic generated by a network device regarding packets in a network flow, wherein the receiving the network flow metadata generated by the network device includes further receiving network flow metadata records from one of: a network tap, a tap port of a router, a tap port of a switch, a span port of the router, or a span port of the switch;

accessing, by the network packet broker, a network flow metadata processing rules database and identifying a network flow metadata processing rule to apply to the network flow metadata;
wherein the processing, by the network packet broker, the network flow metadata using the network flow metadata processing rule to produce or identify egress network flow metadata; and
forwarding, by the network packet broker, the egress network flow metadata to a network tool,
wherein the forwarding the egress network flow metadata to the network tool includes further forwarding the egress network flow metadata to a network flow metadata collector,
wherein the method further comprises receiving packet copies and network flow log data,
wherein the identifying the network flow metadata processing rule includes further identifying a network flow metadata aggregation rule to apply to the network flow metadata, the packet copies, and the network flow log data,
wherein the processing the network flow metadata includes aggregating the network flow metadata with at least one of the packet copies and the network flow log data to create an aggregated network flow metadata record, and
wherein the forwarding the egress network flow metadata includes further forwarding the aggregated network flow metadata record to the network tool.

6. The method of claim 1 wherein the receiving the network flow metadata includes further receiving a network flow metadata record formatted according to a first network flow metadata format, the identifying the network flow metadata processing rule includes further identifying a network flow metadata format translation rule to apply to the network flow metadata record, the processing the network flow metadata includes translating a format of the network flow metadata from the first network flow metadata format to a second network flow metadata format different from the first network flow metadata format to produce a translated network flow metadata record, and the forwarding the egress network flow metadata includes further forwarding the translated network flow metadata record to the network tool.

7. The method of claim 6
wherein the first network flow metadata format comprises a first network flow metadata record format,
wherein the second network flow metadata format includes a second network flow metadata record format different from the first network flow metadata record format, and
wherein the translating the format of the network flow metadata includes further translating the format of the network flow metadata from the first network flow metadata record format to the second network flow metadata record format.

8. A system for processing network flow metadata, the system comprising:
a network packet broker including a network port, at least one processor and a memory, the network port for receiving the network flow metadata, the network flow metadata including a network flow statistic generated by a network device regarding packets in a network flow,
wherein receiving the network flow metadata generated by the network device includes receiving network flow metadata records from one of: a network tap, a tap port of a router, a tap port of a switch, a span port of the router, or a span port of the switch;
a network flow metadata processing rules database stored in the memory and containing rules for processing the network flow metadata; and
a network flow metadata processing engine implemented by the at least one processor for accessing the network flow metadata processing rules database and identifying a network flow metadata processing rule to apply to the network flow metadata, for the processing the network flow metadata using the network flow metadata processing rule to generate or identify egress network flow metadata, and for forwarding, the egress network flow metadata to a network tool,
wherein the forwarding the egress network flow metadata to the network tool includes further forwarding the egress network flow metadata to a network flow metadata collector,
wherein the network flow metadata processing engine is configured to receive at least two network flow metadata records, identify a network flow metadata deduplication processing rule to apply to the at least two network flow metadata records, perform deduplication processing of the at least two network flow metadata records, and forward one of the at least two network flow metadata records to a single tool port.

9. A system for processing network flow metadata the system comprising:
a network packet broker including a network port, at least one processor and a memory, the network port for receiving the network flow metadata, the network flow metadata including a network flow statistic generated by a network device regarding packets in a network flow,
wherein the receiving the network flow metadata generated by the network device includes further receiving network flow metadata records from one of: a network tap, a tap port of a router, a tap port of a switch a span port of the router, or a span port of the switch;
a network flow metadata processing rules database stored in the memory and containing rules for processing the network flow metadata; and
a network flow metadata processing engine implemented by the at least one processor for accessing the network flow metadata processing rules database and identifying a network flow metadata processing rule to apply to the network flow metadata, for the processing the network flow metadata using the network flow metadata processing rule to produce or identify egress network flow metadata, and for forwarding the egress network flow metadata to a network tool,
wherein the forwarding the egress network flow metadata to a network tool includes further forwarding the egress network flow metadata to a network flow metadata collector,
wherein the network flow metadata processing engine is configured to receive a single network flow metadata record, identify a network flow metadata replication rule to apply to the single network flow metadata record, replicate the single network flow metadata record, and forward at least two copies of the single network flow metadata record to at least two different network tools.

10. A system for processing network flow metadata, the system comprising:
a network packet broker including a network port, at least one processor and a memory, the network port for receiving the network flow metadata, the network flow metadata including a network flow statistic generated by a network device regarding packets in a network flow, wherein the receiving the network flow metadata generated by the network device includes further receiving network flow metadata records from one of: a network tap, a tap port of a router, a tap port of a switch, a span port of the router, or a span port of the switch;

a network flow metadata processing rules database stored in the memory and containing rules for the processing the network flow metadata; and a network flow metadata processing engine implemented by the at least one processor for accessing the network flow metadata processing rules database and identifying a network flow metadata processing rule to apply to the network flow metadata, for the processing the network flow metadata using the network flow metadata processing rule to produce or identify egress network flow metadata, and for forwarding, the egress network flow metadata to a network tool, wherein the forwarding the egress network flow metadata to a network tool includes further forwarding the egress network flow metadata to a network flow metadata collector, wherein the network flow metadata processing engine is configured to receive an encrypted network flow metadata record, identify a network flow metadata decryption, processing, and re-encryption rule to apply to the network flow metadata, decrypt the network flow metadata record using a decryption key obtained via a secure backchannel interface to produce a decrypted network metadata record, perform at least one operation on the decrypted network flow metadata record, re-encrypt the decrypted network flow metadata record to produce a re-encrypted network flow metadata record, and forward the re-encrypted network metadata flow record to the network tool.

11. The system of claim 10 wherein the network flow metadata processing engine is configured to perform at least one of: network flow metadata deduplication, replication, aggregation, enrichment, and format translation processing on the decrypted network flow metadata record.

12. A system for processing network flow metadata, the system comprising:

a network packet broker including a network port, at least one processor and a memory, the network port for receiving the network flow metadata, the network flow metadata including a network flow statistic generated by a network device regarding packets in a network flow, wherein the receiving the network flow metadata generated by the network device includes further receiving network flow metadata records from one of: a network tap, a tap port of a router, a tap port of a switch, a span port of the router, or a span port of the switch;

a network flow metadata processing rules database stored in the memory and containing rules for the processing the network flow metadata; and a network flow metadata processing engine implemented by the at least one processor for accessing the network flow metadata processing rules database and identifying a network flow metadata processing rule to apply to the network flow metadata, for the processing the network flow metadata using the network flow metadata processing rule to produce or identify egress network flow metadata, and for forwarding, the egress network flow metadata to a network tool, wherein the forwarding the egress network flow metadata to the network tool includes further forwarding the egress network flow metadata to a network flow metadata collector, wherein the network flow metadata processing engine is configured to receive packet copies and network flow log data, identify a network flow metadata aggregation rule to apply to the network flow metadata, the packet copies, and the network flow log data, aggregate the network flow metadata with at least one of the packet copies and the network flow log data to create an aggregated network flow metadata record, and forward the aggregated network flow metadata record to the network tool.

13. The system of claim 8 wherein the network flow metadata processing engine is configured to receive a network flow metadata record formatted according to a first network flow metadata format, identify a network flow metadata format translation rule to apply to the network flow metadata record, translate a format of the network flow metadata from the first network flow metadata format to a second network flow metadata format different from the first network flow metadata format to produce a translated network flow metadata record, and forward the translated network flow metadata record to the network tool.

14. The system of claim 13 wherein the first network flow metadata format comprises a first network flow metadata record format, wherein the second network flow metadata format includes a second network flow metadata record format, and wherein the network flow metadata processing engine is configured to translate the network flow metadata from the first network flow metadata record format to the second network flow metadata record format.

15. A non-transitory computer readable medium having stored thereon executable instructions that when executed by a processor of a computer control the computer to perform steps comprising:

receiving, as input at a network port of a network packet broker, network flow metadata, the network flow metadata including a network flow statistic generated by a network device regarding packets in a network flow, wherein the receiving the network flow metadata generated by the network device includes further receiving network flow metadata records from one of: a network tap, a tap port of a router, a tap port of a switch a span port of the router, or a span port of the switch;

accessing, by the network packet broker, a network flow metadata processing rules database and identifying a network flow metadata processing rule to apply to the network flow metadata;

processing, by the network packet broker, the network flow metadata using the network flow metadata processing rule to produce or identify egress network flow metadata; and forwarding, by the network packet broker, the egress network flow metadata to a network tool, wherein the forwarding the egress network flow metadata to the network tool includes further forwarding the egress network flow metadata to a network flow metadata collector, wherein the receiving the network flow metadata includes further receiving at least two network flow metadata records, the identifying a network flow metadata processing rule includes further identifying a network flow metadata deduplication processing rule to apply to the at least two network flow metadata records, the processing the network flow metadata includes performing deduplication processing of the at least two network flow metadata records, and the forwarding the egress network flow metadata includes further forwarding one of the at least two network flow metadata records to a single tool port.

* * * * *

UNITED STATES PATENT AND TRADEMARK OFFICE
CERTIFICATE OF CORRECTION

PATENT NO. : 11,190,417 B2  
APPLICATION NO. : 16/781542  
DATED : November 30, 2021  
INVENTOR(S) : Raney et al.

Page 1 of 1

It is certified that error appears in the above-identified patent and that said Letters Patent is hereby corrected as shown below:

In the Claims

In Column 16, Line 13, in Claim 8, delete "forwarding," and insert -- forwarding --.

In Column 16, Line 27, in Claim 9, delete "metadata" and insert -- metadata, --.

In Column 16, Line 38, in Claim 9, delete "switch" and insert -- switch, --.

In Column 17, Line 21, in Claim 10, delete "forwarding," and insert -- forwarding --.

In Column 18, Line 1, in Claim 12, delete "forwarding," and insert -- forwarding --.

In Column 18, Line 49, in Claim 15, delete "switch" and insert -- switch, --.

Signed and Sealed this  
Thirteenth Day of September, 2022

Katherine Kelly Vidal  
*Director of the United States Patent and Trademark Office*